US 7,881,928 B2

(12) United States Patent
Gao et al.

(10) Patent No.: US 7,881,928 B2
(45) Date of Patent: Feb. 1, 2011

(54) ENHANCED LINGUISTIC TRANSFORMATION

(75) Inventors: Yuqing Gao, Mount Kisco, NY (US); Liang Gu, Yorktown Heights, NY (US); Wei Zhang, Ossining, NY (US)

(73) Assignee: International Business Machines Corporation, Armonk, NY (US)

(*) Notice: Subject to any disclaimer, the term of this patent is extended or adjusted under 35 U.S.C. 154(b) by 771 days.

(21) Appl. No.: 11/680,863

(22) Filed: Mar. 1, 2007

(65) Prior Publication Data

US 2008/0077386 A1 Mar. 27, 2008

Related U.S. Application Data

(60) Provisional application No. 60/841,814, filed on Sep. 1, 2006.

(51) Int. Cl.
*G10L 15/00* (2006.01)
(52) U.S. Cl. .................. 704/231; 704/9; 704/251; 704/2; 704/8; 704/3; 704/4; 704/246; 704/255; 704/270; 704/275
(58) Field of Classification Search .............. 704/2–8, 704/246, 251, 255, 270, 275
See application file for complete search history.

(56) References Cited

U.S. PATENT DOCUMENTS 5,696,980 A * 12/1997 Brew .................... 704/273
5,754,978 A * 5/1998 Perez-Mendez et al. ..... 704/255

(Continued)

FOREIGN PATENT DOCUMENTS

WO     WO 2005122144 A1 * 12/2005

OTHER PUBLICATIONS

Okimoto, Speech Recognition Device, Speech Recognition Method and Program, Dec. 22, 2005, Patent Translation of WO 2005/122144, pp. 1-29.*

(Continued)

*Primary Examiner*—David R Hudspeth
*Assistant Examiner*—Lamont M Spooner
(74) *Attorney, Agent, or Firm*—Anne V. Dougherty; Ryan, Mason & Lewis, LLP

(57) ABSTRACT

Techniques for enhanced linguistic transformation are disclosed. For example, a method of linguistic transformation includes the steps of providing at least one input to a plurality of modules, wherein at least one module has a different configuration than at least another module, obtaining at least one output from each of at least a subset of the plurality of modules, and generating a set of distinct outputs. The input and the output include linguistic representations and at least a portion of the output is a result of applying one or more linguistic transformations to at least a portion of the input.

Techniques for displaying a plurality of results so as to emphasize component-level differences are also disclosed. By way of example, a method of displaying a plurality of results includes the steps of determining at least one primary result within the plurality of results; displaying the at least one primary result with at least a first set of color attributes; and displaying at least one alternative result with at least a second set of color attributes. Each result represents an application of at least one linguistic transformation to a common input and each result comprises a plurality of components.

15 Claims, 6 Drawing Sheets

U.S. PATENT DOCUMENTS

| | | | |
|---|---|---|---|
| 6,085,162 A * | 7/2000 | Cherny | 704/277 |
| 6,282,507 B1 * | 8/2001 | Horiguchi et al. | 704/3 |
| 6,292,775 B1 * | 9/2001 | Holmes | 704/209 |
| 6,502,072 B2 * | 12/2002 | Jiang et al. | 704/255 |
| 6,526,380 B1 * | 2/2003 | Thelen et al. | 704/251 |
| 6,754,629 B1 * | 6/2004 | Qi et al. | 704/246 |
| 7,257,528 B1 * | 8/2007 | Ritchie et al. | 704/7 |
| 7,286,989 B1 * | 10/2007 | Niedermair et al. | 704/275 |
| 7,483,833 B2 * | 1/2009 | Peters | 704/270 |
| 7,620,496 B2 * | 11/2009 | Rasmussen | 701/212 |
| 7,650,283 B2 * | 1/2010 | Mizutani et al. | 704/257 |
| 2002/0026319 A1 * | 2/2002 | Niie et al. | 704/270 |
| 2003/0187644 A1 * | 10/2003 | Mohri et al. | 704/256 |
| 2005/0010863 A1 * | 1/2005 | Zernik | 715/511 |
| 2005/0055217 A1 * | 3/2005 | Sumita et al. | 704/277 |
| 2006/0020464 A1 * | 1/2006 | Ju et al. | 704/257 |
| 2007/0124693 A1 * | 5/2007 | Dominowska et al. | 715/772 |
| 2007/0239506 A1 * | 10/2007 | Jania et al. | 705/8 |
| 2007/0294610 A1 * | 12/2007 | Ching | 715/500 |
| 2008/0167872 A1 * | 7/2008 | Okimoto et al. | 704/251 |
| 2009/0063152 A1 * | 3/2009 | Munakata | 704/260 |

OTHER PUBLICATIONS

E. Singer et al., "Acoustic, Phonetic, and Discriminative Approaches to Automatic Language Identification," Proc. Eurospeech, Sep. 2003, pp. 1345-1348.

* cited by examiner

300

310 — The quick brown fox jumps over the lazy dog.
321 — A quick brown fox jumps over the hazy fog.
322 — The quick frown box bumps over the crazy dog.
323 — A quick brown fox jumps over a lazy frog.
324 — The slicked-down pox slumps over a lazy log.
325 — The quick frown box jumps over the crazy frog.

410 — The quick brown fox jumps over the lazy dog.
421 — A quick brown fox jumps over the *hazy fog.*
422 — The quick *frown box bumps* over the *crazy* dog.
423 — A quick brown fox jumps over *a* lazy *frog.*
424 — The *slicked-down pox slumps* over *a* lazy *log.*
425 — The quick *frown box* jumps over the *crazy frog.*

510 — The quick brown fox jumps over the lazy dog.
521 — A quick brown fox jumps over the *h*azy *f*og.
522 — The quick *f*rown *b*ox *b*umps over the *cr*azy dog.
523 — A quick brown fox jumps over *a* lazy *fr*og.
524 — The *sl*ick*ed-d*own *p*ox *sl*umps over *a* lazy *l*og.
525 — The quick *f*rown *b*ox jumps over the *cr*azy *fr*og.

FIG. 5

```
                                                                                      600
610 ────── The quick brown fox jumps over the lazy dog.
621 ────── A   quick  brown  fox  jumps  over  a  lazy  frog.
622 ────── A   quick  brown  fox  jumps  over  the  hazy  fog.
623 ────── The quick  frown  box  jumps  over the  crazy  frog.
624 ────── The quick  frown  box  bumps over the  crazy  dog.
625 ────── The slicked-down  pox  slumps over  a  lazy  log.
```

FIG. 6

```
                                                                                      700
710 ────── The  quick  brown  fox  jumps  over  the  lazy  dog.
721 ────── TheA quick  brown  fox  jumps  over the  lhazy  dfog.
722 ────── The  quick  bfrown  fbox  jbumps over the  lcrazy  dog.
723 ────── TheA quick  brown  fox  jumps  over  thea  lazy  dfrog.
724 ────── The  quslicked-brdown fpox jslumps over thea lazy log.
725 ────── The  quick  bfrown  fbox  jumps  over the  lcrazy  dfrog.
```

FIG. 7

ENHANCED LINGUISTIC TRANSFORMATION

CROSS-REFERENCE TO RELATED APPLICATIONS

The present application claims the benefit of U.S. Provisional Application No. 60/841,814, filed Sep. 1, 2006, and incorporated by reference herein.

The present invention is related to U.S. patent application identified by Ser. No. 11/680,870 (entitled "Virtual Keyboard Adaptation for Multilingual Input"), filed concurrently herewith and incorporated by reference herein.

The present invention was made with Government support under Contract No. NBCH2030001 awarded by the Defense Advanced Research Projects Agency (DARPA). The Government has certain rights in this invention.

FIELD OF THE INVENTION

This invention relates in general to linguistic transformations and, more particularly, to an apparatus and method of enhancing the accuracy and display of linguistic transformations.

BACKGROUND OF THE INVENTION

Computers are increasingly used to perform various linguistic transformations, such as translation, transliteration, transcription, speech recognition, and speech synthesis. However, various algorithmic limitations often prevent exact transformations from being generated in all situations. Instead, an engine may generate a set of possible interpretations with associated probability values. One common technique for improving the accuracy of an automated linguistic transformation is to use a single transformation engine to generate a set of the most likely results (N-best list). These results are presented to a user, who is then prompted to select the correct result.

This technique is commonly employed, for example, in the context of speech-to-speech translation. For example, a user may select the most accurate transcription of an input sentence from the N-best list generated by an automatic speech recognition (ASR) engine for further processing by a machine translation (MT) engine into a target language. However, while this N-best ASR methodology is now widely adopted to improve word recognition accuracy, it can most often only marginally improve the sentence recognition accuracy, which is much more important for the enhancement of speech-to-speech translation accuracy.

Another problem with current N-best approaches is the dilemma of determining the number of N-best results to be shown to the users. Although an increased number of displayed results will increase the chances that the correct result will be among those shown, it will also increase the amount of time necessary for the user to parse the results and determine the best choice. This is particularly challenging when the correct sentence is not the in N-best list to be selected. In mere seconds, a user may need to choose an incorrect sentence from an N-best list, which may contain dozens or even hundreds of entries, that is closest to the correct sentence. Furthermore, the N-best results are typically generated based solely on posterior possibilities; user selections are not utilized to improve performance and accuracy.

Thus, there is a need for a technique for linguistic transformation that generates N-best lists with significantly improved accuracy, with both minimal length and the correct result included, and with significant adaptation capability when user feedbacks are provided. There is a need for an interactive user interface that renders result linguistic representations, such an N-best list, easier for a user to parse and process.

SUMMARY OF THE INVENTION

Principles of the invention provide improved techniques for linguistic transformation through the parallel generation of N-best lists by multiple modules running in parallel and improved techniques for displaying a plurality of results so as to emphasize component-level differences.

By way of example, in one aspect of the present invention, a method of linguistic transformation includes the steps of providing at least one input to a plurality of modules, wherein at least one module has a different configuration than at least another module, obtaining at least one output from each of at least a subset of the plurality of modules, and generating a set of distinct outputs. The input and the output include linguistic representations and at least a portion of the output is a result of applying one or more linguistic transformations to at least a portion of the input.

The method may include an additional step of sorting this output set based on at least one score value associated with each member of the output set. The method may also include steps of presenting the at least one output to a user and permitting the user to select at least one output from the presented outputs. This user selection may alter the order in which future output is presented. For example, the method may include further steps of designating a module which generates output selected by the user as a preferred module and presenting output generated by at least one preferred module in an altered manner.

In another aspect of the present invention, a method of speech recognition includes the steps of providing at least one spoken input to a plurality of speech recognition modules, wherein at least one speech recognition module has a different configuration than at least another speech recognition module, obtaining at least one recognition output from each of at least a subset of the plurality of speech recognition modules; and generating a recognition output set, wherein the recognition output set comprises at least a portion of a set of distinct recognition outputs obtained from the speech recognition modules. The method may also include the additional steps of providing the at least one recognition output to a plurality of translation modules, wherein at least one translation module has a different configuration than at least another translation module, obtaining at least one translation output from each of at least a subset of the plurality of translation modules, and generating a translation output set, wherein the translation output set comprises at least a portion of a set of distinct translation outputs obtained from the translation modules.

In a further aspect of the present invention, a method of displaying a plurality of results includes the steps of determining at least one primary result within the plurality of results; displaying the at least one primary result with at least a first set of color attributes; and displaying at least one alternative result with at least a second set of color attributes. Each result represents an application of at least one linguistic transformation to a common input and each result includes a plurality of components. These components may be, for example, characters, phonemes, morphemes, words, sentences or paragraphs.

The method may include displaying at least a portion of the components which are identical in a primary result and an alternative result with a first set of color attributes and displaying at least a portion of the components which are different in a primary result and an alternative result with a second set of color attributes. The method may instead include displaying at least a portion of the components which are present in both a primary result and an alternative result with a first set of color attributes, displaying at least a portion of the components which are present in a primary result but not present in an alternative result with a second set of color attributes, displaying at least a portion of the components which are not present in a primary result but are present in an alternative result with a third set of color attributes. The method may also include using a value associated with at least one color attribute within the at least one set of color attributes is used to indicate a level of difference between a primary result and an alternative result.

Advantageously, principles of the invention provide for the generation of N-best lists with significantly improved accuracy, with both minimal length and the correct result included, and with significant ability for adaptation based on user feedback. Principles of the invention further provide for the display of a plurality of results in a manner which highlights distinctions between results and thus facilitates more rapid and accurate user selection thereof.

These and other objects, features and advantages of the present invention will become apparent from the following detailed description of illustrative embodiments thereof which is to be read in connection with the accompanying drawings.

BRIEF DESCRIPTION OF THE DRAWINGS

FIG. 3 is an exemplary display depicting an illustrative embodiment of the invention wherein a primary result is displayed with one set of color attributes and an alternative result is displayed with another set of color attributes.

FIG. 4 is an exemplary display depicting an illustrative embodiment of the invention wherein words which are different in a primary result and an alternative result are displayed with a different set of color attributes.

FIG. 5 is an exemplary display depicting an illustrative embodiment of the invention wherein letters which are different in a primary result and an alternative result are displayed with a different set of color attributes.

FIG. 6 is an exemplary display depicting an illustrative embodiment of the invention wherein letters which are different in a primary result and an alternative result are displayed with a different set of color attributes and wherein a value associated with a color attribute is used to indicate a level of difference between a primary result and an alternative result.

FIG. 7 is an exemplary display depicting an illustrative embodiment of the invention wherein letters which are present in a primary result but not present in an alternative result are displayed with one set of color attributes and letters which are not present in a primary result but are present in an alternative result are displayed with another set of color attributes.

DETAILED DESCRIPTION OF PREFERRED EMBODIMENTS

Figure 1:
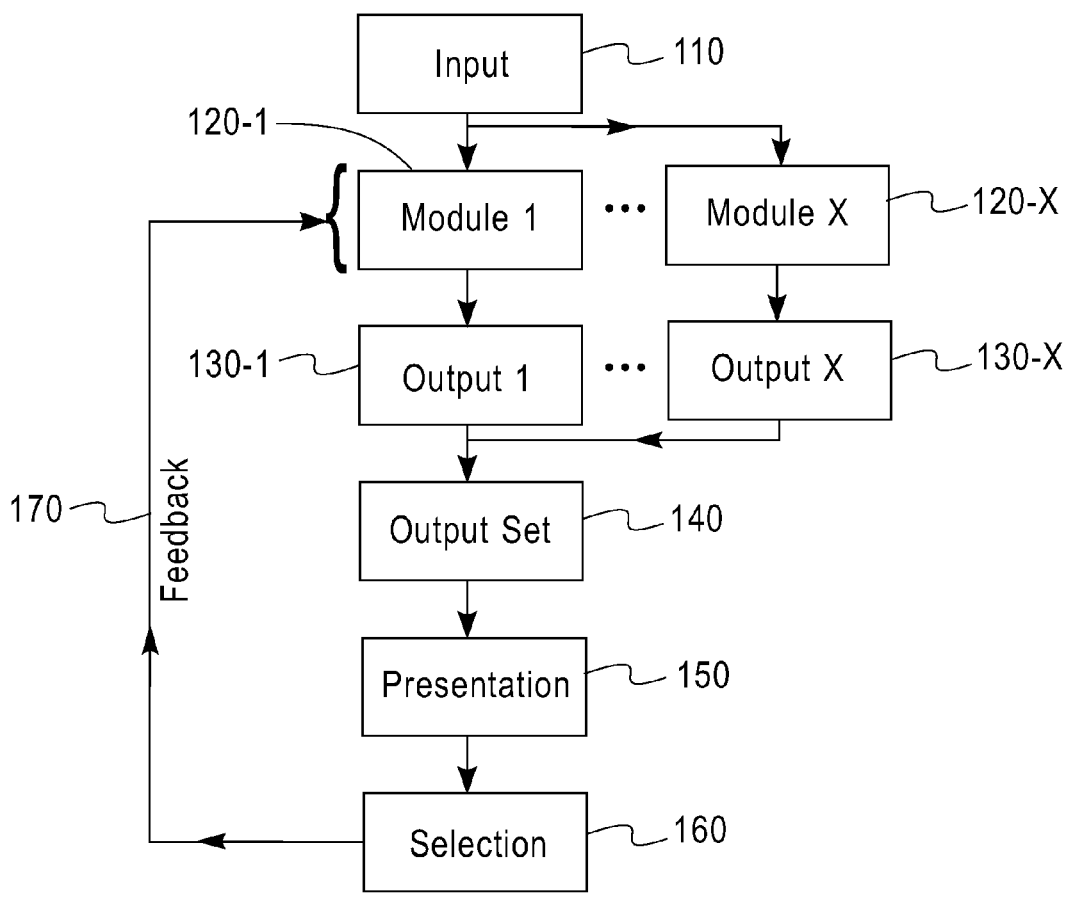
FIG. 1 is a block diagram depicting an exemplary embodiment of the present invention.

FIG. 1 is a block diagram depicting an embodiment of the present invention. In step 110, an input linguistic representation is provided; this input may include, for example, one or more words, phrases, and/or sentences. It may include speech or text, depending on the linguistic transformation to be performed, which may include one or more of transcription (including speech recognition and/or speech synthesis), translation (i.e., transforming from one language to another while preserving meaning), and transliteration (i.e., transforming from one language to another while preserving pronunciation).

Input 110 is then processed by a plurality of modules (120-1, ... 120-X), each of which may generate as output an N-best list (130-1, ... 130-X). Any number X of modules may be used in conjunction with inventive techniques. Each output 130 may include one or more members, each of which is a linguistic representation which represents the result of a linguistic transformation on input 110. Each output 130 may include the same number of representations or each may contain a different number of representations.

Each module 120 should have a different configuration from the others. Thus, each module 120 should be capable of generating an output 130 which is distinct (e.g., at least one member is present in one set but not in another or a set is sorted differently) from the output of another module. For example, if modules 120 are automatic speech recognition modules, each may have different acoustic model and/or a different language model. This configuration may be capable of being modified in response to user selections, as discussed below with reference to step 160.

In step 140, outputs 130 may be combined into one output set. Preferably, this output set will be composed of at least a part of the distinct members of outputs 130 (i.e., with duplicate values removed). This step may also include assigning a score value to each member of the output set, representing a probability that this member is an accurate linguistic transformation of the input (e.g., a Bayesian posterior probability). This score value may be calculated using any one of a variety of factors, including a probability value and/or ordering calculated by one or more of modules 120; one or more Bayesian models; how many distinct output sets a given member appeared in; and/or previous user selections. For example, as discussed below with reference to step 170, one or more modules may have been designated as preferred modules based on previous user selections and output generated by these preferred modules may be assigned a correspondingly higher score value.

In step 150, the output set generated in step 140 may be displayed or otherwise presented to a user. This presentation will be ordered based on the score values assigned to each member of the output set. For example, the members may be presented in descending order of score value (i.e., most probable at top). Also, some members of the output set may be presented in altered manner. For example, output generated by a preferred module may be presented with an altered characteristic (i.e., a different font, color, pitch or volume).

In step 160, the user may select one or more members of the output set which represent the most accurate linguistic transformation of the input. For example, in a speech recognition application, this may be the correct transcription of the spoken input. This user selection preferably influences future outputs via feedback 170. For example, the module or modules which generated the selected text, or the module or modules which assigned the highest probability value to the selected text, may be designated as preferred modules. As discussed above, future output of preferred modules may be assigned a higher score value, which may cause it to be presented higher in a list, or it may be presented with an altered characteristic. Additionally, the configuration of at least one module may be modified based at least in part on feedback 170.

This method may be repeated an arbitrary number of times, with the selected output of step 160 used as an input of step 110 to perform a further linguistic transformation. For example, in a speech-to-speech translation application, the steps described above may be performed first when transcribing a spoken input in a source language, wherein modules 120 are automatic speech recognition modules. The output of this first transformation (e.g., in step 160) may be text in a source language. The method may then be performed on this source-language text wherein modules 120 are machine translation modules and the output is text in a destination language. Finally, the outputted destination-language text may be input into the method a third time, wherein modules 120 are speech synthesis modules and the output is speech in a destination language.

It may be particularly advantageous to apply principles of the present invention to the provision of a speech recognition apparatus in speech-to-speech translation. Such an apparatus may generate N-best lists based on multiple speech recognizers running in parallel and re-rank N-best lists according to user feedbacks. Each speech recognizer has its own acoustic model and language model and may be built and trained independently. These acoustic models and language models are further combined and evaluated for each speech recognizer. Only the N top-performing acoustic-model/language-model/speech-recognizer (AM/LM/SR) combinations are kept to generate N-best ASR results, with one result from one ASR acoustic-model/language-model/speech-recognizer setting respectively.

Even with only a small number of speech recognizers (e.g., 3 or 4) running in parallel, both word recognition and sentence recognition accuracy may improve dramatically and thus greatly improve speech-to-speech translation performance. In addition, as the unique number of N-best ASR results is usually much less than the total number of speech recognizers running in parallel, the users only need to select the correct ASR output from a small number of recognition candidates. Therefore, the resulting N-best ASR approach is much more user friendly and user satisfaction rate may be greatly improved.

The AM/LM/SR settings may be further adapted using the corresponding user feedbacks. Initially, the results from N AM/LM/SR speech recognizers are ranked using the posterior probability of each recognized text. Users are asked to pick the correct one from these results that will be translated into another language. The user preference shown from this selection procedure may indicate the favorableness of each speech recognizer running in parallel for this specific user and for the specific conversational environment. Therefore, the N-best ASR results are later ranked not only based on the posterior probability of the recognized text but also based on these specific user preferences.

Figure 2:
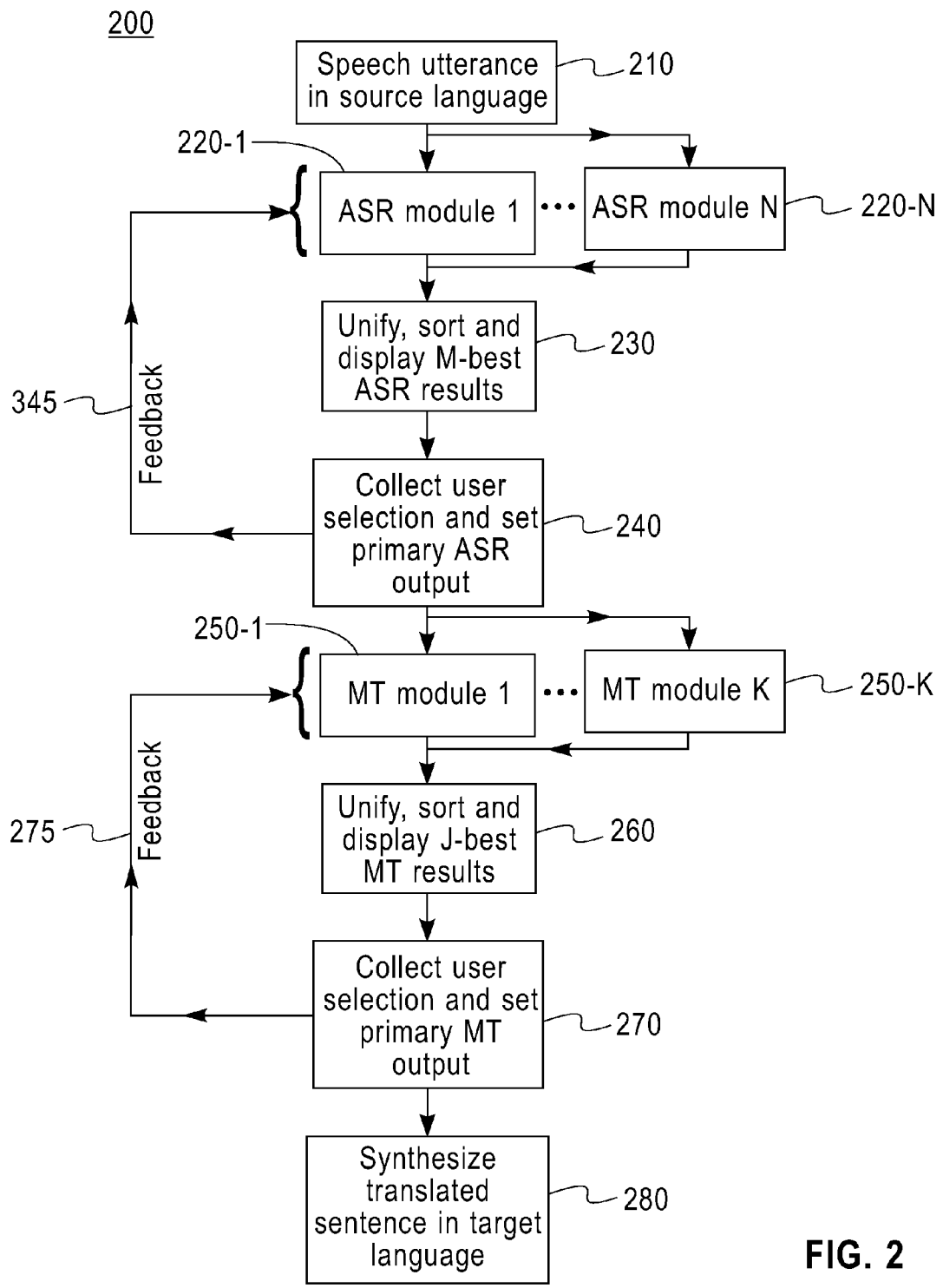
FIG. 2 is a block diagram depicting an exemplary speech-to-speech translation system employing techniques of the present invention.

FIG. 2 is a block diagram depicting another exemplary speech-to-speech translation method employing techniques of the present invention. Specifically, in method 200, multiple translators as well as multiple speech recognizers are used in parallel. In step 210, source-language speech is received and stored them in an audio buffer. Next automatic speech recognition (ASR) is performed in parallel using a plurality 220 of N ASR modules denoted 220-1, . . . 220-N. Each ASR module 220 generates one result and thus a total of N recognition results are achieved from N ASR modules. Any number N of ASR modules may be used in conjunction with inventive techniques. Preferably, each ASR module uses a different algorithm so as to generate distinct results.

In step 230, the N recognition results are unified and sorted into a M-best recognition list, where M≦N and each candidate in the M-best list is different from the other candidates (i.e., only distinct values are retained). The default order of the results in the M-best list is based on posterior probability.

In step 240, the user may select a candidate in the M-best list as the primary recognition output. The selection frequency for each ASR module may be used to further determine the order of the M-best ASR lists via feedback 245. For example, the next output of the ASR module which generated the primary recognition output may be ordered at the top of the list regardless of posterior probability.

This recognition output is then used as the input to a plurality 250 of K machine translation (MT) modules denoted 250-1, . . . 250-K. Each MT module 250 generates one result and thus a total of K recognition results are achieved from K MT modules. Any number K of MT modules may be used in conjunction with inventive techniques. Preferably, each MT module uses a different algorithm so as to generate distinct results.

In step 260, the K translation results are unified and sorted into a J-best translation list, where J≦K and each candidate in the J-best list is different from the other candidates (i.e., only distinct values are retained). The default order of the results in the J-best list is based on posterior probability.

In step 270, the user may select a candidate in the J-best list as the primary translation output. The selection frequency for each MT module may be used to further determine the order of the J-best MT lists via feedback 275 For example, the next output of the translator which generated the primary translation output may be ordered at the top of the list regardless of posterior probability. In step 280, a text-to-speech (TTS) synthesis is performed on the translated sentence and the resulting sound is played.

Another aspect of the present invention will be described herein in the context of the display of an exemplary output including six sentences which represent transcriptions of a spoken sentence generated by a speech recognition process. One sentence is designated as a primary result and the other five sentences are designated as alternative results. It is to be understood, however, that the techniques of the present invention are not limited to the illustrative methods and apparatus shown and described herein. Rather, the invention is more generally applicable to linguistic transformations generally, including but not limited to transcription, translation, transliteration, speech recognition, and speech synthesis. Moreover, the output may include any form of linguistic representation, including letters, words, sentences, paragraphs, etc. Furthermore, it is to be understood that the techniques of the present invention may be used with any number of primary and alternative results.

Due to color drawing restrictions imposed on patent applications examined by the United States Patent and Trademark Office, different sets of color attributes are indicated in the figures through the use of different text styles. For example, italics may represent one color attribute (e.g., red hue) and underlining may represent another color attribute (e.g., green hue), and bolding may represent yet another color attribute (e.g., blue hue). Further, the absence of a particular text style may represent a further color attribute (e.g., white hue).

FIG. 3 is an exemplary display depicting an illustrative embodiment of the invention wherein a primary result is displayed with one set of color attributes and an alternative result is displayed with at least another set of color attributes. On display 300, primary result 310 is displayed in a bold font, which here represents one color attribute (e.g., white hue). Alternative results 321-325 are displayed in a non-bold, non-italic font, which may represent another color attribute (e.g., red hue). These differences in color attributes serve to highlight the primary result. Because the primary result is that which is believed to be the most accurate result, it is also the result which is believed to be the likeliest user selection. Thus, highlighting the primary result makes it easier for the user to determine whether it is, in fact, a correct result and, if so, to quickly select it.

FIG. 4 is an exemplary display depicting an illustrative embodiment of the invention wherein words which are different in a primary result and an alternative result are displayed with a different set of color attributes. On display 400, primary result 410 is again displayed in a bold font, which represents one color attribute (e.g., white hue). However, alternative results 421-425 are displayed using two color attributes: those words which are the same in the alternative result and in the primary result are displayed using normal font, which represents one color attribute (e.g., white hue or red hue) and those words which are different in the alternative result and in the primary result are displayed with bold italics, which represents another color attribute (e.g., green hue). This serves to highlight those words which differ in the alternative results and thus to facilitate rapid and accurate comparison of the alternative results with the primary result.

FIG. 5 is an exemplary display depicting an illustrative embodiment of the invention wherein letters which are different in a primary result and an alternative result are displayed with a different set of color attributes. On display 500, primary result 510 is again displayed in a bold font, representing one color attribute (e.g., white hue). However, here, alternative results 521-525 are displayed using two color attributes: those letters which are the same in the alternative result and in the primary result are displayed using normal font, representing one color attribute (e.g., white hue or red hue). On the other hand, those letters which are different in the alternative result and in the primary result are displayed with bold italics, which represents another color attribute set (e.g., green hue). This serves to highlight differences between, and thus to facilitate rapid and accurate comparison of, the alternative results and the primary result.

FIG. 6 is an exemplary display depicting an illustrative embodiment of the invention wherein letters which are different in a primary result and an alternative result are displayed with a different set of color attributes and wherein a value associated with the set of color attributes is used to indicate a level of difference between a primary result and an alternative result. On display 600, primary result 610 is again displayed in a bold font, representing one color attribute (e.g., white hue). Alternative results 621-625 are displayed using two color attributes: those words which are the same in an alternative result and in the primary result are displayed using normal font, representing one color attribute (e.g., white hue or red hue), and those words which are different in an alternative result and in the primary result are displayed with underlining, representing a second color attribute (e.g., green hue).

This embodiment includes an additional feature of using a value associated with the underlining color attribute to indicate a level of difference between an alternative result and a primary result. Words within an alternative result which differ from corresponding words within the primary result by one letter (for example, fox and box) are displayed with a single underline, representing one value of an attribute (e.g., a brightness level of 30) and words within an alternative result which differ from corresponding words within the primary result by two letters (for example, lazy and crazy) are displayed with a double underline, representing another value of an attribute (e.g., a brightness level of 60). Words which differ by more than two letters are displayed with a bold underline, representing a third value of an attribute (e.g., a brightness level of 90). This level of difference may be based at least in part on at least one distance metric, such as edit distance, phonetic distance, and semantic distance. It should be further noted that alternative results 621-625 on display 600 are sorted based on the level of difference between each alternative result and the primary result.

FIG. 7 is an exemplary display depicting an illustrative embodiment of the invention wherein letters which are present in the primary result but not present in the alternative result are displayed with one set of color attributes and letters which are not present in the primary result but are present in the alternative result are displayed with another set of color attributes. On display 700, primary result 710 is again displayed in bold font, representing one color attribute (e.g., white hue).

Alternative results 721-725 are displayed using three color attributes. Those letters which are the same in the alternative result and in the primary result are displayed using normal font, representing a first color attribute (e.g., white hue or red hue). Those letters which are present in the alternative result but not in the primary result are displayed in bold italic, representing a second color attribute (e.g., green hue). Those letters which are present in the primary result but not in the alternative result are displayed in bold underline, representing a third color attribute (e.g., blue hue).

Figure 8:
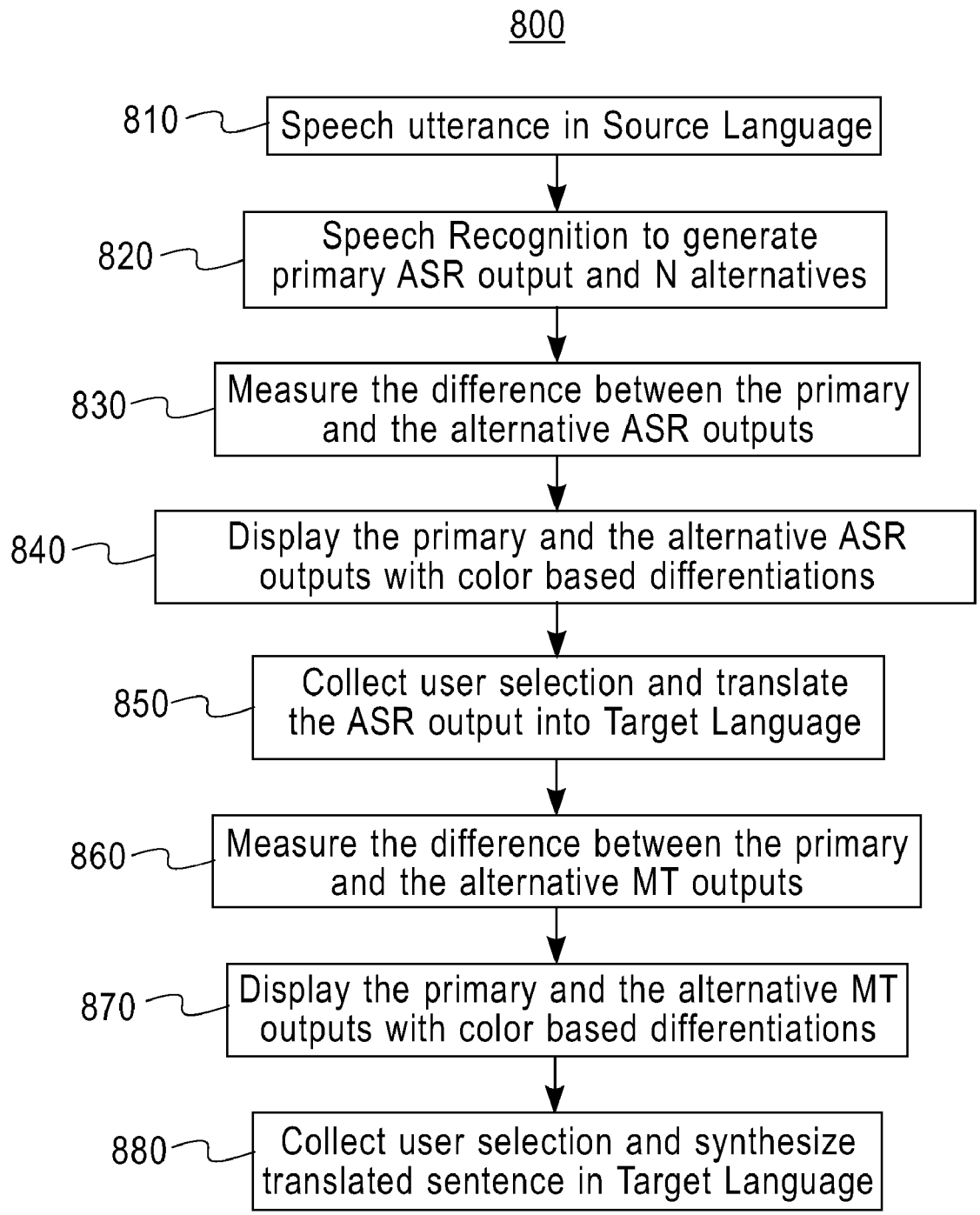
FIG. 8 is a flow chart depicting an exemplary method of speech-to-speech translation using inventive techniques.

FIG. 8 is a flow chart depicting an exemplary method of speech-to-speech translation using inventive techniques. Method 800 begins in step 810, with receiving speech signals in a source language and storing them in an audio buffer. In step 820, a speech recognizer analyzes the speech message corresponding to the waveform signals in the audio buffer and generates a primary result and N alternative results. In step 830, differences between the primary result and the N alternative results are measured.

In step 840, the calculated differences between the primary result and N alternative results are displayed using color based indicators, such as color types, brightness of the color, temperature of the color, etc. These differences may be measured between a primary output and a result or between one result and another result. The information used to calculate the difference may vary from simple measurement such as letter-based edit distance or word-based edit distance, to more complex measurement such as semantic similarity and syntactic similarity. In any case, the outcome of this measurement will consist of either one or two parameters. If only one parameter is calculated, it will be used to determine the tone of the color to be displayed. If there is another parameter calculated, it will be used to set the brightness of the color.

In step 850, the user may select one output from the N-best ASR results as the sentence to be translated. If no action is made, the primary result will be translated. The selected sentence is then translated into the target language, generating one primary result and M alternative results. In step 860, differences are measured between the primary result and the M alternative results.

In step 870, the calculated differences between the primary result and M alternative results are displayed using color based indicators, such as color types, brightness of the color, temperature of the color, etc. These differences may be measured between a primary output and a result or between one result and another result. The information used to calculate the difference may vary from simple measurement such as letter-based edit distance or word-based edit distance, to more complex measurement such as semantic similarity and syntactic similarity. In any case, the outcome of this measurement will consist of either one or two parameters. If only one parameter is calculated, it will be used to determine the tone of the color to be displayed. If there is another parameter calculated, it will be used to set the brightness of the color.

In step 880, the user may select one output from the M-best MT results as the sentence to be synthesized. If no action is made, the primary result will be synthesized. This sentence is then synthesized based on pre-trained text-to-speech (TTS) models and output.

Figure 9:
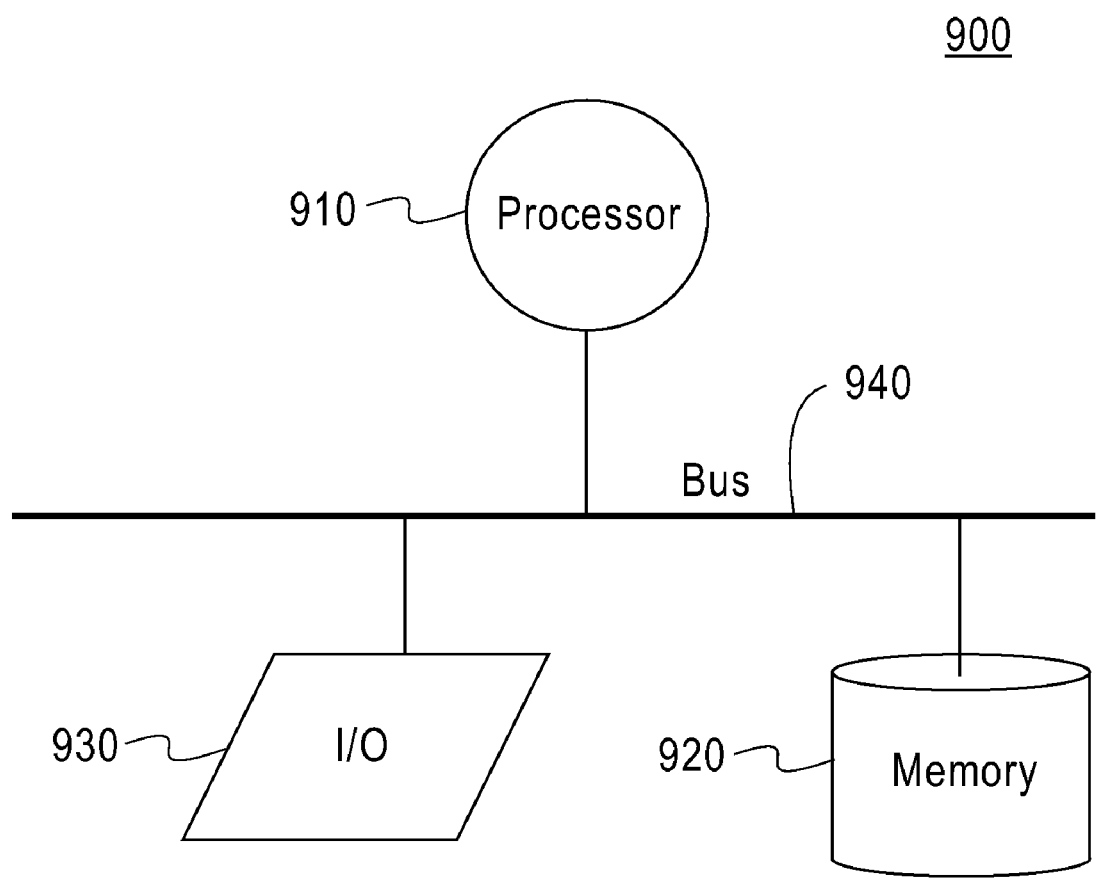
FIG. 9 is a block diagram depicting an exemplary processing system in which techniques of the invention may be implemented.

The methodologies of the invention may be particularly well-suited for use in an electronic device or result system. For example, FIG. 9 is a block diagram depicting an exemplary processing system 900. System 900 may include processor 910, memory 920 coupled to the processor (e.g., via bus 930 or a result connection), as well as input/output (I/O) circuitry 940 operative to interface with the processor. Processor 910 may be configured to perform at least a portion of the methodologies of the present invention, illustrative embodiments of which are shown in the above figures and described therein.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

Accordingly, an application program, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by processor 910. In any case, it is to be appreciated that at least a portion of the components shown in the above figures may be implemented in various forms of hardware, software, or combinations thereof, e.g., one or more DSPs with associated memory, application-specific integrated circuit(s), functional circuitry, one or more operatively programmed general purpose digital computers with associated memory, etc. Given the teachings of the invention provided herein, one of ordinary skill in the art will be able to contemplate other implementations of the components of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of linguistic transformation, the method comprising the steps of:
providing at least one input to a plurality of modules, wherein at least a first module has a different configuration than at least a second module;
obtaining at least one output from each of at least a subset of the plurality of modules;
generating an output set, wherein the output set comprises at least a portion of a set of distinct outputs obtained from the modules;
presenting the output set to a user;
permitting the user to select at least one output from the presented output set; and
presenting at least one future output generated by at least one module with an altered characteristic relative to at least one future output generated by other modules, wherein the at least one module at least one of:
generated the at least one output selected by the user; and
assigned a high probability value to the at least one output selected by the user;
wherein the input and the output comprise linguistic representations and at least a portion of the output is a result of applying one or more linguistic transformations to at least a portion of the input;
wherein generating the output set comprises a step of removing duplicates from the outputs obtained from the modules such that each output within the output set is distinct.

2. The method of claim 1, further comprising the step of:
sorting the output set based on at least one score value associated with each member of the output set, wherein the at least one score value associated with a given member of the output set is based at least in part on how many of the plurality of modules generated the given member of the output set.

3. The method of claim 1, further comprising the steps of:
determining at least one primary result within the output set;
displaying the at least one primary result with at least a first set of color attributes; and
displaying at least one alternative result with at least a second set of color attributes.

4. The method of claim 1, wherein the at least one module generated the at least one output selected by the user.

5. The method of claim 1, wherein the at least one module assigned a high probability value to the at least one output selected by the user.

6. A system for linguistic transformation, the system comprising:
a memory; and
at least one processor coupled to the memory and operative to:
provide at least one input to a plurality of modules, wherein at least a first module has a different configuration than at least a second module;
obtain at least one output from each of at least a subset of the plurality of modules;
generate an output set, wherein the output set comprises at least a portion of a set of distinct outputs obtained from the modules;
present the output set to a user;
permit the user to select at least one output from the presented output set; and present at least one future output generated by at least one module with an altered characteristic relative to at least one future output generated by other modules, wherein the at least one module at least one of:
  generated the at least one output selected by the user; and
  assigned a high probability value to the at least one output selected by the user;
wherein the input and the output comprise linguistic representations and at least a portion of the output is a result of applying one or more linguistic transformations to at least a portion of the input;
wherein generating the output set comprises a step of removing duplicates from the outputs obtained from the modules such that each output within the output set is distinct.

7. An article of manufacture for linguistic transformation, comprising a computer-readable storage medium containing one or more programs which when executed implement the steps of:
  providing at least one input to a plurality of modules, wherein at least a first module has a different configuration than at least a second module;
  obtaining at least one output from each of at least a subset of the plurality of modules;
  generating an output set, wherein the output set comprises at least a portion of a set of distinct outputs obtained from the modules;
  presenting the output set to a user;
  permitting the user to select at least one output from the presented output set; and
  presenting at least one future output generated by at least one module with an altered characteristic relative to at least one future output generated by other modules, wherein the at least one module at least one of:
    generated the at least one output selected by the user; and
    assigned a high probability value to the at least one output selected by the user
  wherein the input and the output comprise linguistic representations and at least a portion of the output is the result of applying one or more linguistic transformations to at least a portion of the input; and
  wherein generating the output set comprises a step of removing duplicates from the outputs obtained from the modules such that each output within the output set is distinct.

8. A method of displaying a plurality of results so as to emphasize component-level differences, the method comprising the steps of:
  determining at least one primary result within the plurality of results;
  displaying the at least one primary result with at least a first set of color attributes; and
  displaying at least one alternative result,
  wherein each result represents an application of at least one linguistic transformation to a common input, and
  wherein each result comprises a plurality of components;
  wherein a given alternative result is displayed with at least a second set of color attributes if only one component differs between the primary result and the given alternative result; and
  wherein the given alternative result is displayed with at least a third set of color attributes if a plurality of components differ between the primary result and the given alternative result.

9. The method of claim 8, wherein the step of displaying at least one alternative result comprises:
  displaying at least a portion of the components which are identical in the primary result and the given alternative result with the first set of color attributes; and
  displaying at least a portion of the components which are different in the primary result and the given alternative result with a set of color attributes other than the first set of color attributes.

10. The method of claim 8, wherein the plurality of results is generated by performing the steps of:
  providing at least one input to a plurality of modules, wherein at least one module has a different configuration than at least another module;
  obtaining at least one output from each of at least a subset of the plurality of modules; and
  generating a plurality of results, wherein the plurality of results comprises at least a portion of a set of distinct outputs obtained from the modules;
  wherein generating the plurality of results comprises a step of removing duplicates from the outputs obtained from the modules such that each result within the plurality of results is distinct.

11. The method of claim 8, wherein each component consists of a letter and each result comprises one or more words.

12. The method of claim 8, wherein each component consists of a word and each result comprises a plurality of words.

13. A system for displaying a plurality of results so as to emphasize component-level differences, the system comprising:
  a memory; and
  at least one processor coupled to the memory and operative to:
  determine at least one primary result within the plurality of results;
  display the at least one primary result with at least a first set of color attributes; and
  display at least one alternative result,
  wherein each result represents an application of at least one linguistic transformation to a common input, and
  wherein each result comprising a plurality of components;
  wherein a given alternative result is displayed with at least a second set of color attributes if only one component differs between the primary result and the given alternative result; and
  wherein the given alternative result is displayed with at least a third set of color attributes if a plurality of components differ between the primary result and the given alternative result.

14. An article of manufacture for displaying a plurality of results so as to emphasize component-level differences, the article comprising a machine readable medium containing one or more programs which when executed implement the steps of:
  determining at least one primary result within the plurality of results;
  displaying the at least one primary result with at least a first set of color attributes; and
  displaying at least one alternative result,
  wherein each result represents an application of at least one linguistic transformation to a common input, and
  wherein each result comprises a plurality of components;
  wherein a given alternative result is displayed with at least a second set of color attributes if only one component differs between the primary result and the given alternative result; and wherein the given alternative result is displayed with at least a third set of color attributes if a plurality of components differ between the primary result and the given alternative result.

15. A method of linguistic transformation, the method comprising the steps of:
providing at least one input to a plurality of modules, wherein at least one module has a different configuration than at least another module;
obtaining at least one output from each of at least a subset of the plurality of modules;
generating an output set, wherein the output set comprises at least a portion of a set of distinct outputs obtained from the modules,
determining at least one primary result within the output set;
displaying the at least one primary result with at least a first set of color attributes; and
displaying at least one alternative result,
wherein the input and the output comprise linguistic representations and at least a portion of the output is a result of applying one or more linguistic transformations to at least a portion of the input;
wherein generating the output set comprises a step of removing duplicates from the outputs obtained from the modules such that each output within the output set is distinct;
wherein a given alternative result is displayed with at least a second set of color attributes if only one component differs between the primary result and the given alternative result; and
wherein the given alternative result is displayed with at least a third set of color attributes if a plurality of components differ between the primary result and the given alternative result.

* * * * *